Patented Jan. 2, 1945

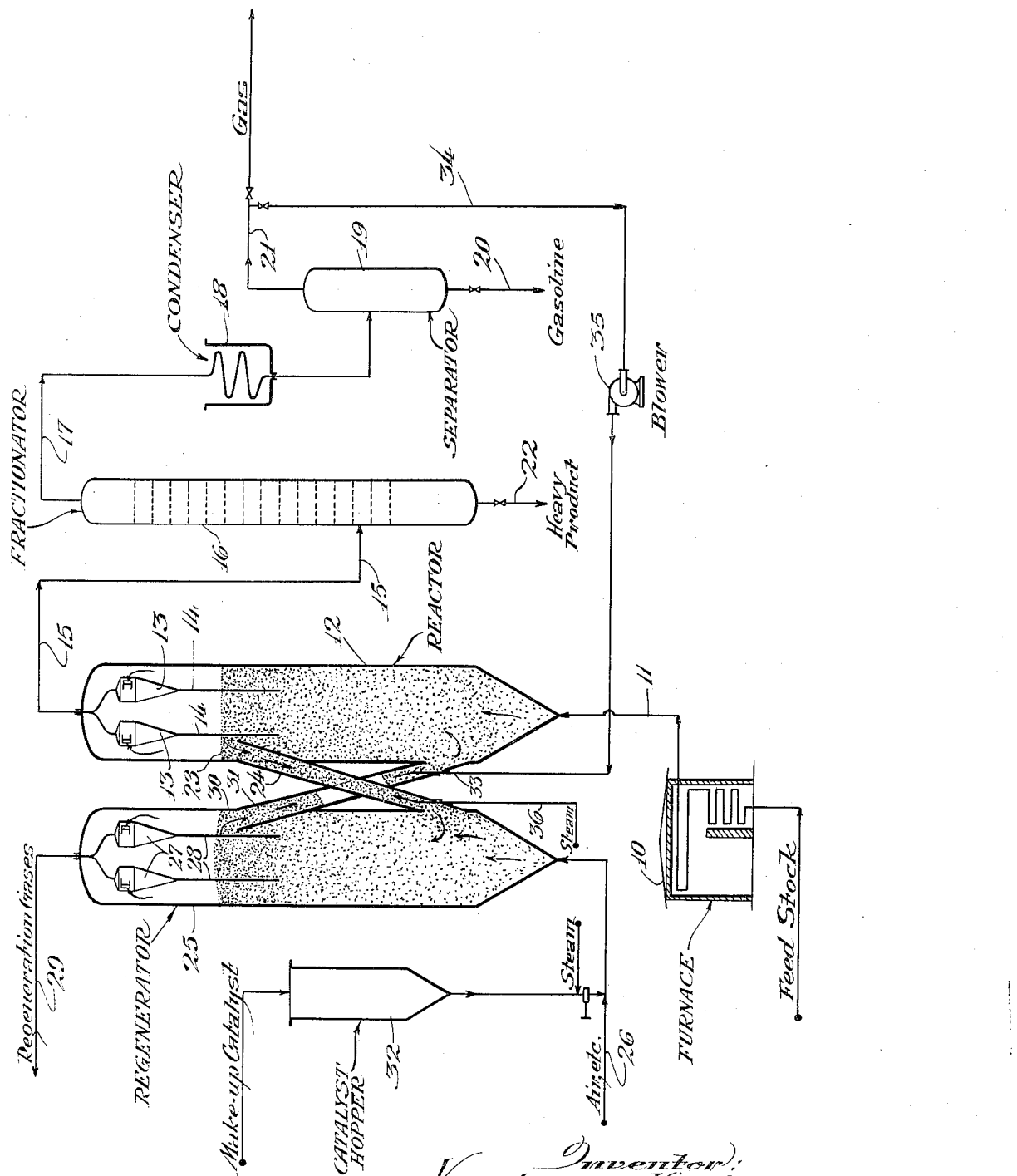

2,366,372

UNITED STATES PATENT OFFICE 2,366,372

TRANSFERRING CATALYSTS

Vanderveer Voorhees, Homewood, Ill., assignor to Standard Oil Company, Chicago, Ill., a corporation of Indiana Application September 11, 1941, Serial No. 410,385

5 Claims. (Cl. 196—52)

This invention relates to a process of regenerating finely divided or granular catalysts and more particularly hydrocarbon conversion catalysts employed in suspension in hydrocarbon vapors for the purpose of converting them into gasoline of high knock rating. In the treatment of hydrocarbons with powdered, solid, conversion catalysts at elevated temperatures it is necessary to frequently reactivate the catalysts by burning off carbon deposited thereon. The life of the catalyst in any one cycle may commonly be about 10 minutes to 2 hours. In some operations such as in dehydrogenation or hydroforming of high knock rating gasoline, the life of the catalyst may be extended by the use of hydrogen for a period of 10 to 20 hours, more or less, depending on the type of catalyst employed, the character of the stock treated and the reaction conditions.

It is an object of my invention to facilitate the regeneration and transfer of catalyst between a reactor and a regenerator. Another object of my invention is to assist in maintaining the temperature of the reaction zone. Still another object of my invention is to avoid catalyst deterioration resulting from transfer of catalyst in the presence of certain objectionable gases such as steam. A further object of my invention is to provide means for transferring catalyst from a regeneration zone to a reaction zone and vice versa with a minimum pressure differential. The invention is illustrated by a drawing which shows diagrammatically a hydrocarbon conversion reactor and associated catalyst regenerator.

Referring to the drawing, feed stock which may be gas oil, residual oil or other heavy oil higher boiling than gasoline which is to be cracked into gasoline or which may be heavy naptha to be reformed, for example, in the presence of hydrogen and/or hydrocarbon gases, may be heated in furnace 10 to a high conversion temperature, for example 850 to 1050° F. The vapors are conducted by transfer line 11 to reactor 12. In the case of very heavy, unvaporizable stocks such as residuums, these may be charged to the reactor at a somewhat lower temperature in partially vaporized condition. In general, however, the feed stock will be completely vaporized and heated within the preferred temperature range for cracking, usually about 900 to 950° F. within the reactor 12. Somewhat higher temperatures, e. g., 975 to 1050° F., may be employed for reforming naphthas.

Reactor 12 contains in suspension conversion catalyst preferably in finely divided form having a screen size of the order of 50 to 400 mesh, usually about 100 to 200 mesh. Expressed another way, the major part of the catalyst may have a particle size within the range of about 5 to 80 microns. Coarser catalyst may be employed where sufficiently turbulent conditions are maintained within the reactor. The upflowing hydrocarbon vapors introduced from line 11 prevent the settling of the catalyst and maintain it in a heavy suspension within the reactor. By proper regulation of vapor velocities I may thus employ catalysts as coarse as 10 to 20 mesh.

By controlling vapor velocities in relation to catalyst particle size, density, etc., the catalyst may be maintained largely in a so-called "dense phase" in the lower part of the reactor. The amount of catalyst in dense phase may be of the order of 5 to 25 pounds per cubic foot, generally about 12 to 15 pounds in the case of siliceous cracking catalysts. On quiescent settling the density of this material will increase as the catalyst becomes a compacted, solid cake. This is prevented from taking place by the turbulent conditions maintained in the apparatus. When subjected to higher turbulence with higher vapor velocities, the dense phase can be transformed into a "disperse phase" in which the concentration of the catalyst is relatively uniform thruout the vapor volume. In distinction to this, catalyst in the dense phase seeks a level, much as does a true liquid. I prefer to operate my process under conditions in which a dense phase catalyst level is maintained within the reactor and also the regenerator to be described presently.

As the hydrocarbon vapors pass thru the reactor in contact with the catalyst therein they are substantially converted into the desired high knock rating gasoline and pass out of the reactor thru dust separators 13 which may conveniently be of the cyclone type. Catalyst separated herein is conducted by dip legs 14 back into the lower part of the reactor. Vapors pass out thru line 15 leading to fractionator 16 where the gasoline and lighter products are separated and withdrawn by line 17 thru condenser 18 into separator 19. Gasoline is withdrawn by line 20 while gases, withdrawn by line 21, may be conducted to a suitable gas recovery plant. Heavy products are withdrawn from the base of fractionator 16 by line 22 and may be recycled, in whole or in part, to the conversion operation or, if desired, to a noncatalytic thermal conversion system.

Catalyst in reactor 12 flows continuously into overflow 23 which may be simply an opening into the overflow line 24 but is preferably a weir providing a fixed level for the dense phase catalyst in the reactor. The overflow line 24 leads to a low point in regenerator 25 where the catalyst suspension is maintained in the presence of an oxidizing gas which removes by combustion from the catalyst surfaces those carbonaceous deposits which interfere with the catalytic conversion process. Air may be employed in the regenerator introduced thru line 26 and the oxygen concentration may be controlled by diluting the air with inert gases such as flue gas, nitrogen, etc.

The temperature of the regenerator may be controlled by various means such as by cooling coils not shown, by recycling cold inert gases, or by recycling cooled regenerated catalyst in desired amounts to maintain the temperature within the optimum range. The regeneration temperature will depend largely upon the type of catalyst employed. Certain catalysts, for example, the magnesia catalysts are more sensitive to temperature and should not be heated much above 1200° F. Other catalysts such as the synthetic alumina-silica catalysts may be heated to 1400 or 1600° F., altho it is generally desirable to maintain the temperature of the regenerator considerably lower than this in order to avoid any possibility of heating the catalyst above its deterioration temperature. Regeneration temperatures in the range of 1000 to 1150° F. are usually satisfactory.

Regeneration gases flow upward thru the regenerator and escape thru cyclone separators 27 and any catalyst which is separated therein is returned to a low point in the regenerator by dip legs 28. Regeneration gases are discharged by line 29 and may be further treated to recover residual suspended catalyst, for example, by electrical precipitation or by scrubbing, etc.

The catalyst in the regenerator continuously overflows outlet 30 into transfer line 31 leading back to a low point in reactor 12. As in the case of outlet 23 it is usually desirable to employ a weir which maintains the level of the catalyst in the regenerator at any desired point at which the weir is set. Weirs employed for this purpose may be vertically adjustable, if desired, thereby regulating the depth of the dense phase catalyst in the regenerator and the reactor. Flow of catalyst thru lines 24 and 31 may be controlled by regulating the amount of catalyst in the system and by adjusting the overflow of weirs at outlets 23 and 30. Additional catalyst, for example, may be added to the regeneration gas from hopper 32 to replace losses.

Inasmuch as reactor 12 and regenerator 25 are maintained at about the same pressure, the interchange of catalyst between the two vessels takes place by virtue of the increased catalyst density in transfer lines 24 and 31 in comparison with the density of the catalyst in the dense phase within the reactor and the regenerator. For example, if the dense phase of catalyst in the reactor and the regenerator weighs 10 pounds per cubic foot, the density in the transfer lines 24 and 31 may be 20 to 30 pounds per cubic foot or even more, for example, 45 pounds per cubic foot.

As a result of the substantial absence of turbulence within the transfer lines, it is apparent that in order to obtain free flow of catalyst between the regenerator and the reactor under the low pressure differentials established by the difference in density of the catalyst just referred to, transfer lines 24 and 31 must be of relatively large diameter and free from restriction. These requirements have introduced a serious problem of preventing oxidizing gases from the regenerator entering the reactor as well as preventing vapors from the reactor entering the regenerator. Heretofore, it has been proposed to employ mechanically operated feeders or valves in lines 24 and 31 to prevent the objectionable transfer of gases between the regenerator and the reactor. Other devices have been proposed such as various types of seals, traps, etc. However, all these devices suffer from the disadvantage of increasing resistance to catalyst flow and preventing rapid exchange of catalyst between regenerator and reactor.

It has also been proposed to sweep regeneration gases from the regenerated catalyst flowing to the reactor by injecting inert gas or steam thereinto. However, in order to obtain substantially complete removal of oxidizing gas from the regenerated catalyst by this method, it is necessary to employ large volumes of inert gas with the disadvantage that the transfer of catalyst is retarded and also the temperature of the catalyst is undesirably reduced. Furthermore, when steam is employed for this purpose, deactivation of the regenerated catalyst occurs and the steam which enters the regenerator from the transfer line is likewise objectionable for the same reason.

According to the present invention transfer of oxidizing gas from the regenerator to the reactor along with the regenerated catalyst is prevented by injecting into the catalyst a relatively small amount of a reducing gas which combines with the oxygen in the catalyst so that it is not necessary to displace the oxidizing gas as heretofore. Furthermore, the combustion of the added reducing gas and the oxygen associated with the catalyst produces a desirable increase in the temperature of the catalyst immediately before entering the reactor and thus largely compensates for the loss of heat in transferring the catalyst from the regenerator to the reactor or even in raising the temperature above the average regenerator temperature. The result of this is to maintain the reactor temperature at a higher level than has heretofore been possible without the use of special heating devices. The drawing shows a means for introducing reducing gas for this purpose at 33.

Gas used at 33 for scavenging oxygen from regenerated catalyst may be fuel gas, methane, propane, natural gas or other hydrocarbon gas, hydrogen or most conveniently hydrocarbon gases produced in the conversion operation itself. These may be conducted to line 31 from separator 19 by line 34 and blower 35.

The scavenging gas introduced at 33 combines immediately with the oxidizing gas in the catalyst which is above kindling temperature, e. g., 700 to 1000° F., producing carbon monoxide and carbon dioxide. The resulting gaseous products assist in aerating the catalyst in line 31 keeping it in free flowing condition. It is desirable to control the amount of scavenging gas introduced to maintain a slight excess above that necessary for destroying the oxygen in the regenerated catalyst. Some reduction of metal oxides in the catalyst to lower states of oxidation may also occur. Because of the small amount of gas required for scavenging, it is not necessary to provide means for transferring it into the regenerator and in fact the products of the scavenging action will pass largely into the reactor where a slight excess of scavenging gas of reducing character is not harmful. In general, the amount of scavenging gas (standard conditions) required is only of the order of 0.5 to 10 cubic feet per 100 cubic feet of regenerated catalyst transferred.

In the transfer of catalyst from the reactor to the regenerator thru line 24 it is less essential to sweep from the catalyst the associated reaction gases because these gases are simply destroyed in the regenerator without having any particularly undesirable effect on the operation of the process other than adding somewhat to the heat in the regenerator. In the case of regeneration gases entering the reactor, however, the oxidizing action resulting therefrom produces undesirable oxygen-containing reaction products. The oxygen also accelerates the deposition of carbon on the catalyst and thereby reduces catalyst activity. It is generally sufficient to sweep the spent catalyst flowing in line 24 with the small current of steam injected by line 36 to prevent the transfer of an excessive amount of reaction gases and vapors into the regenerator. Simultaneously, aeration of the catalyst in the transfer line is obtained.

Altho my process is not limited to any specific type of catalyst or conversion operation, it is particularly adapted to the cracking of heavy oils and the reforming of hydrocarbon motor fuels, straight run heavy napthas, etc. The catalysts employed in cracking are usually of the siliceous type, for example, mixtures of active silica with various promoters such as active alumina, magnesia, zirconia, etc. Natural clays, especially bentonite activated with acid, are also suitable. For dehydrogenation in naptha reforming I prefer catalysts such as the oxides of the VIth group metals, particularly the oxides of chromium and molybdenum, as well as vanadium oxide and copper oxide, especially when deposited on carriers, particularly active alumina. My method of catalyst transfer may be applied to any similar reaction-regeneration operation in which the catalyst is suspended in the gases and vapors and wherein it is desirable to maintain very low pressure differentials with high rates of catalyst transfer. For example, in the cracking of petroleum oils the amount of catalyst which must be transferred from the regenerator to the reactor may be about 1 to 10 pounds of catalyst per pound of oil treated and about 2 to 4 pounds of catalyst is customary. The transfer of this amount of catalyst is an important problem in the operation of this type of process. By facilitating catalyst transfer, I am enabled to largely increase catalyst to oil ratio, for example, to 20 or 30 pounds of catalyst per pound of oil treated, if desired, thereby gaining the advantage of a higher level of catalyst activity in the reactor at little or no increase in cost of operation. By the same token, the regenerator temperature is more easily controlled owing to the transfer of more hot catalyst to the reactor where it is cooled.

Having thus described my invention what I claim is:

1. In the process of converting hydrocarbons wherein said hydrocarbons are contacted at conversion temperature with a finely divided solid catalyst in suspension in a vertically elongated reaction zone through which the hydrocarbons flow upwardly, the hydrocarbons are separated from the catalyst, the catalyst is conducted in a fluidized stream to a vertically elongated regeneration zone wherein it is contacted at combustion temperature with oxygen-containing gases flowing upwardly for the removal of carbonaceous deposits and the regenerated catalyst is returned in a fluidized stream to said reaction zone, the improvement comprising conducting said regenerated catalyst and entrained oxygen-containing gas in a dense, confined fluidized stream flowing under the influence of gravity thru an unobstructed passage directly from said regeneration zone to said reaction zone, scavenging entrained oxygen from said regenerated catalyst while transferring it to said reaction zone by introducing a combustible gas into the stream of catalyst flowing from said regeneration zone to said reaction zone, the amount of gas being at least sufficient to react with all the oxygen entrained in said catalyst and maintaining the temperature of said regenerated catalyst stream above the kindling temperature to facilitate combustion of said scavenging gas.

2. The process of claim 1 wherein the amount of combustible gas employed is about 0.5 to 10 cubic feet per 100 cubic feet of regenerated catalyst transferred.

3. The process of claim 1 wherein said combustible gas is comprised of hydrocarbon gases separated from the products of said reaction.

4. An apparatus for treating hydrocarbons at elevated temperature with suspended, solid, conversion catalysts which comprises a reactor, a catalyst regenerator adjacent thereto, a duct leading directly from an elevated point in said reactor to a lower point in said regenerator for conducting catalyst entirely by gravity from said reactor to said regenerator substantially without reduction in temperature, a second duct leading directly from an elevated point in said regenerator to a lower point in said reactor adapted to conduct a stream of regenerated catalyst to said reactor entirely by gravity, means for charging and discharging hydrocarbon vapors to and from said reactor, means for maintaining an oxidizing atmosphere in said regenerator and means for introducing a reducing gas into said second duct for scavenging oxidizing gas from said stream of regenerated catalyst.

5. In the process of converting hydrocarbons wherein said hydrocarbons are contacted with a finely divided solid catalyst in suspension in a reaction zone, the hydrocarbons are separated from the catalyst, the catalyst is conducted in a fluidized stream to a regeneration zone on approximately the same level with said reaction zone and adjacent thereto, wherein it is contacted with an oxygen-containing gas for the removal of carbonaceous deposits and the regenerated catalyst is returned in a fluidized stream to said reaction zone, the improvement comprising conducting catalyst from an elevated point in said reaction zone thru an unobstructed passage directly to a low point in said regeneration zone, conducting regenerated catalyst from an elevated point in said regeneration zone thru an unobstructed passage to a low point in said reaction zone, maintaining the level of fluidized catalyst within said reaction zone and said regeneration zone above the point of withdrawal of catalyst therefrom, maintaining the density of catalyst in the said catalyst streams above the density of fluidized catalyst in said zones, thereby providing sufficient pressure differential to effect circulation of catalyst between said zones, scavenging entrained oxygen from regenerated catalyst before transferring to said reaction zone by introducing a reducing gas into the stream of catalyst flowing from said regeneration zone to said reaction zone, the amount of gas being sufficient to react with all the oxygen entrained in said catalyst and maintaining the temperature of said regenerated catalyst stream above the kindling temperature to facilitate combustion of said scavenging gas.

VANDERVEER VOORHEES.